United States Patent
Chao et al.

(10) Patent No.: US 10,917,418 B2
(45) Date of Patent: *Feb. 9, 2021

(54) SMART INTRUSION PREVENTION POLICY

(71) Applicant: International Business Machines Corporation, Armonk, NY (US)

(72) Inventors: Chih-Wen Chao, Taipei (TW); Hsin-Yu Chuang, Taoyuan (TW); Ming-Pin Hsueh, New Taipei (TW); Sheng-Wei Lee, Changhua (TW)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/438,550

(22) Filed: Jun. 12, 2019

(65) Prior Publication Data

US 2019/0297098 A1    Sep. 26, 2019

Related U.S. Application Data

(63) Continuation of application No. 15/237,717, filed on Aug. 16, 2016, now Pat. No. 10,397,247.

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
CPC .................. H04L 63/1416; H04L 63/1441
See application file for complete search history.

(56) References Cited

U.S. PATENT DOCUMENTS

| | | | |
|---|---|---|---|
| 7,150,043 B2 | 12/2006 | Brock et al. |
| 7,424,744 B1 | 9/2008 | Wu et al. |
| 7,735,137 B2 | 6/2010 | Baik et al. |
| 7,893,830 B2 | 2/2011 | Anand et al. |
| 8,474,043 B2 | 6/2013 | Sturges et al. |
| 8,561,129 B2 | 10/2013 | Diehl et al. |
| 8,665,868 B2 | 3/2014 | Kay |
| 9,288,290 B2 | 3/2016 | Natarajan et al. |
| 2010/0115621 A1 | 5/2010 | Staniford et al. |

(Continued)

OTHER PUBLICATIONS

Debar et al., "Using contextual security policies for threat response", printed on Jun. 10, 2016, 20 pages.

(Continued)

*Primary Examiner* — Tri M Tran
(74) *Attorney, Agent, or Firm* — Brian M. Restauro

(57) ABSTRACT

A data packet is received. The data packet is a unit of data transmitted across a packet-switched network. A determination is made whether a new connection is detected. The data packet is transmitted using the new connection. In response to determining that a new connection is detected, a connection context for the new connection is added to a current connection context in a dynamic event table. The dynamic event table includes the current connection context, one or more previous connection contexts, and a listing of one or more events. Each event of the one or more events is a malicious activity and is retrieved from a repository. A score for each event is calculated based on the current connection context. Each event in the dynamic event table is prioritized based on the calculated score for each event. The event with the highest score receives the highest priority.

15 Claims, 4 Drawing Sheets

(56) References Cited

U.S. PATENT DOCUMENTS

2010/0189004 A1 7/2010 Mirandette et al.
2015/0058988 A1 2/2015 Katz et al.
2018/0054450 A1 2/2018 Chao et al.

OTHER PUBLICATIONS

Thinh et al., "A FPGA-Based Deep Packet Inspection Engine for Network Intrusion Detection System", Conference Paper—May 2012, DOI: 10.1109/ECTICon.2012.6254301, Retrieved on: May 11, 2016, © 2012 IEEE, 5 pages.

"Network Intrusion Prevention System for Symantec Endpoint Protection 11.X", User Guide, Symantec, Technical Brief: Sep Network Intrusion Prevention System, Copyright © 2011 Symantec Corporation, 26 pages.

Appendix P—List of IBM Patents or Patent Applications Treated as Related, Filed herewith, 2 pages.

| DYNAMIC EVENT TABLE | | | |
|---|---|---|---|
| CONNECTION CONTEXT | PRIORITY | IPS EVENT | SCORE |
| TCP | 1 | EVENT 1 | 50 |
| | 2 | EVENT 2 | 50 |
| | 3 | EVENT 3 | 50 |

| DYNAMIC EVENT TABLE | | | |
|---|---|---|---|
| CONNECTION CONTEXT | PRIORITY | IPS EVENT | SCORE |
| OPENSSL 1.0.1E | 1 | EVENT 2 | 80 |
| (WAS TCP) | 2 | EVENT 3 | 70 |
| | 3 | EVENT 1 | 0 |

| DYNAMIC EVENT TABLE | | | |
|---|---|---|---|
| CONNECTION CONTEXT | PRIORITY | IPS EVENT | SCORE |
| MYSQL 5.6.21 | 1 | EVENT 3 | 100 |
| (WAS OPENSSL 1.0.1E) | 2 | EVENT 2 | 50 |
| (WAS TCP) | 3 | EVENT 1 | 0 |

SMART INTRUSION PREVENTION POLICY

BACKGROUND

The present invention relates generally to the field of intrusion prevention, and more particularly to prioritizing intrusion events.

Intrusion prevention systems (IPS) are network security appliances that monitor network and/or system activities for malicious activity. The main functions of intrusion prevention systems are to identify malicious activity, log information about this malicious activity, attempt to block/stop the malicious activity, and report the malicious activity. Intrusion prevention systems are considered extensions of intrusion detection systems because they both monitor network traffic and/or system activities for malicious activity. The main differences are, unlike intrusion detection systems, intrusion prevention systems are placed in-line and are able to prevent/block intrusions, in real time, that are detected. More specifically, the IPS can take such actions as sending an alarm, dropping the malicious packets, resetting the connection and/or blocking the traffic from the offending IP (Internet protocol) address. An IPS can also correct Cyclic Redundancy Check (CRC) errors, unfragment packet streams, prevent transmission control protocol (TCP) sequencing issues, and clean up unwanted transport and network layer options.

SUMMARY OF THE INVENTION

Embodiments of the present invention include a method, computer program product, and system for prioritizing intrusion events. In one embodiment, a data packet is received. The data packet is a unit of data transmitted across a packet-switched network. A determination is made whether a new connection is detected. The data packet is transmitted using the new connection. In response to determining that a new connection is detected, a connection context for the new connection is added to a current connection context in a dynamic event table. The dynamic event table includes the current connection context, one or more previous connection contexts, and a listing of one or more events. Each event of the one or more events is a malicious activity. Each event of the one or more events is retrieved from a repository. A score for each event of the one or more events in the dynamic event table is calculated based on the current connection context. Each event of the one or more events in the dynamic event table is prioritized based on the calculated score for each event of the one or more events. The event with the highest score receives the highest priority.

DETAILED DESCRIPTION

Embodiments of the present invention provide for prioritizing intrusion events. Methods used by current intrusion prevention systems (IPS) for finding malicious activity may use a real-time signature matching process which may become a latency bottleneck due to the high number of rules. In addition, IPS administrators may have a complex issue attempting to customize and optimize the high number of rules to suit the specific requirements of the administrator. It is not an efficient practice to enable all of the available rules for the IPS and doing so may result in a performance impact to the network.

Embodiments of the present invention recognize that there may be a method, computer program product, and computer system for prioritizing intrusion events in a signature-based intrusion preventions system. The method, computer program product, and computer system may enhance the efficiency of signature matching by dynamically prioritizing each IPS event throughout the connection based on the connection context information determined from the incoming data packets. Signature matching will be focused on events with a higher priority while less time will be spent on signature matching for events with a lower priority.

The present invention will now be described in detail with reference to the Figures.

Figure 1:
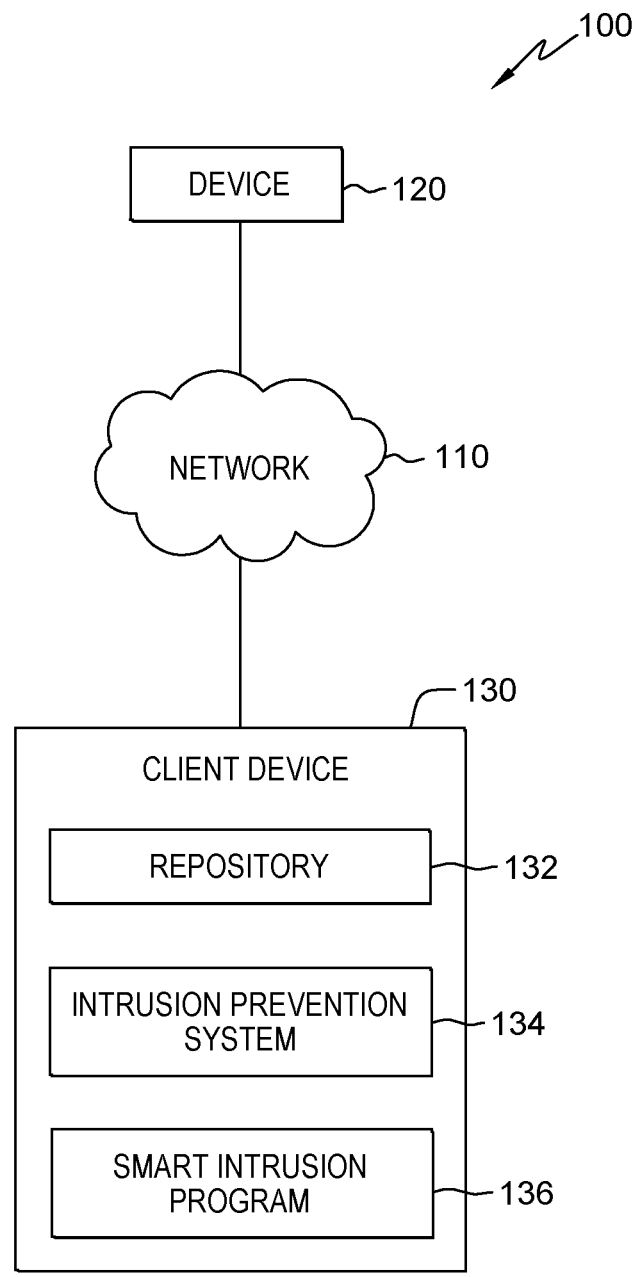
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes device 120 and client device 130 connected to network 110. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with device 120 and client device 130 over network 110.

In example embodiments, device 120 and client device 130 may connect to network 110, which enables device 120 to access other computing devices and/or data not directly stored on device 120 and client device 130. Network 110 may be, for example, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between device 120, client device 130, and any other computing devices connected to network 110, in accordance with embodiments of the present invention. In an embodiment, data received by another computing device in computing environment 100 (not shown) may be communicated to device 120 and client device 130 via network 110.

In embodiments of the present invention, device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, device 120 represents a computer system utilizing clustered computers and components (e.g., database server computers, application server computers, etc.) that act as a single pool of seamless resources when accessed by elements of computing environment 100. In general, device 120 is representative of any electronic device or combination of electronic devices capable of executing computer readable program instructions. Client device 130 is substantially similar to device 120. Computing environment 100 may include any number of device 120 and client device 130. Device 120 and client device 130 may include components as depicted and described in further detail with respect to FIG. 4, in accordance with embodiments of the present invention.

In an embodiment, client device 130 includes repository 132, intrusion prevention system (IPS) 134, and smart intrusion program 136. According to embodiments of the present invention, repository 132 may be storage that may be written to and/or read by smart intrusion program 136. In one embodiment, repository 132 resides on client device 130. In another embodiment, repository 132 resides on device 120. In other embodiments, repository 132 may reside on any other device (not shown) in computing environment 100, in cloud storage or on another computing device accessible via network 110. In yet another embodiment, repository 132 may represent multiple storage devices within device 120 and/or client device 130.

In an embodiment, repository 132 may be implemented using any volatile or non-volatile storage media for storing information, as known in the art. For example, repository 132 may be implemented with a tape library, optical library, one or more independent hard disk drives, multiple hard disk drives in a redundant array of independent disks (RAID), solid-state drives (SSD), or random-access memory (RAM). Similarly, repository 132 may be implemented with any suitable storage architecture known in the art, such as a relational database, an object-oriented database, or one or more tables. In an embodiment of the present invention, smart intrusion program 136 and any other programs and applications (not shown) operating on device 120 may store, read, modify, or write data to repository 132. Examples of data stored to repository 132 include known IPS events including intrusion event signatures, IPS event scores, and IPS event actions. In an embodiment, an IPS event is an activity suspected or known to be malicious (i.e., will harm the network or one or more computing devices connected to the network). In an embodiment, IPS event actions include stopping the activity from proceeding when the activity is deemed malicious (i.e., finding matching signatures), discarding the activity (i.e., data packets) when finding matching signatures, resetting the connection and/or blocking the traffic from the offending IP (Internet protocol) address, and sending an alert when matching signatures are found, thereby deeming the activity malicious.

In an embodiment, IPS 134 is a network security appliance that monitors network and/or system activities for malicious activity. In an embodiment, IPS 134 is part of client device 130. In another embodiment, IPS 134 is a stand-alone device connected to network 110. According to embodiments of the present invention, the main functions of IPS 134 are to identify malicious activity, log information about this activity, attempt to block/stop it, and report it. In an embodiment, IPS 134 can take such actions as sending an alarm, dropping the malicious packets, resetting the connection and/or blocking the traffic from the offending IP address. In an embodiment, IPS 134 uses a signature-based detection method for detecting malicious activity. Signature-based detection monitors packets in the network and compares the packets with pre-configured and pre-determined attack patterns known as signatures. In other embodiments, IPS 134 may use other detections method such as statistical anomaly-based detection and stateful protocol analysis detection.

According to embodiments of the present invention, smart intrusion program 136 may be a program, a subprogram of a larger program, an application, a plurality of applications, or mobile application software, which functions to prioritize intrusion events (i.e., put the intrusion events into a prioritized order). A program is a sequence of instructions written by a programmer to perform a specific task. Smart intrusion program 136 may run by itself but may be dependent on system software (not shown) to execute. In one embodiment, smart intrusion program 136 functions as a stand-alone program residing on client device 130. In another embodiment, smart intrusion program 136 may be included as a part of device 120. In yet another embodiment, smart intrusion program 136 may be included as a part of IPS 134. In yet another embodiment, smart intrusion program 136 may work in conjunction with other programs, applications, etc., found on client device 130 or in computing environment 100. In yet another embodiment, smart intrusion program 136 may be found on other computing devices (not shown) in computing environment 100 which are interconnected to client device 130 via network 110.

According to embodiments of the present invention, smart intrusion program 136 functions to prioritize intrusion events in a signature-based intrusion prevention system such as IPS 134. According to an embodiment of the present invention, smart intrusion program 136 monitors incoming packets of data as the packets move through a network, calculates a score for each IPS event, and prioritizes each IPS event. In an embodiment, smart intrusion program 136 monitors data packets sent by device 120 to client device 130 over network 110.

Figure 2:
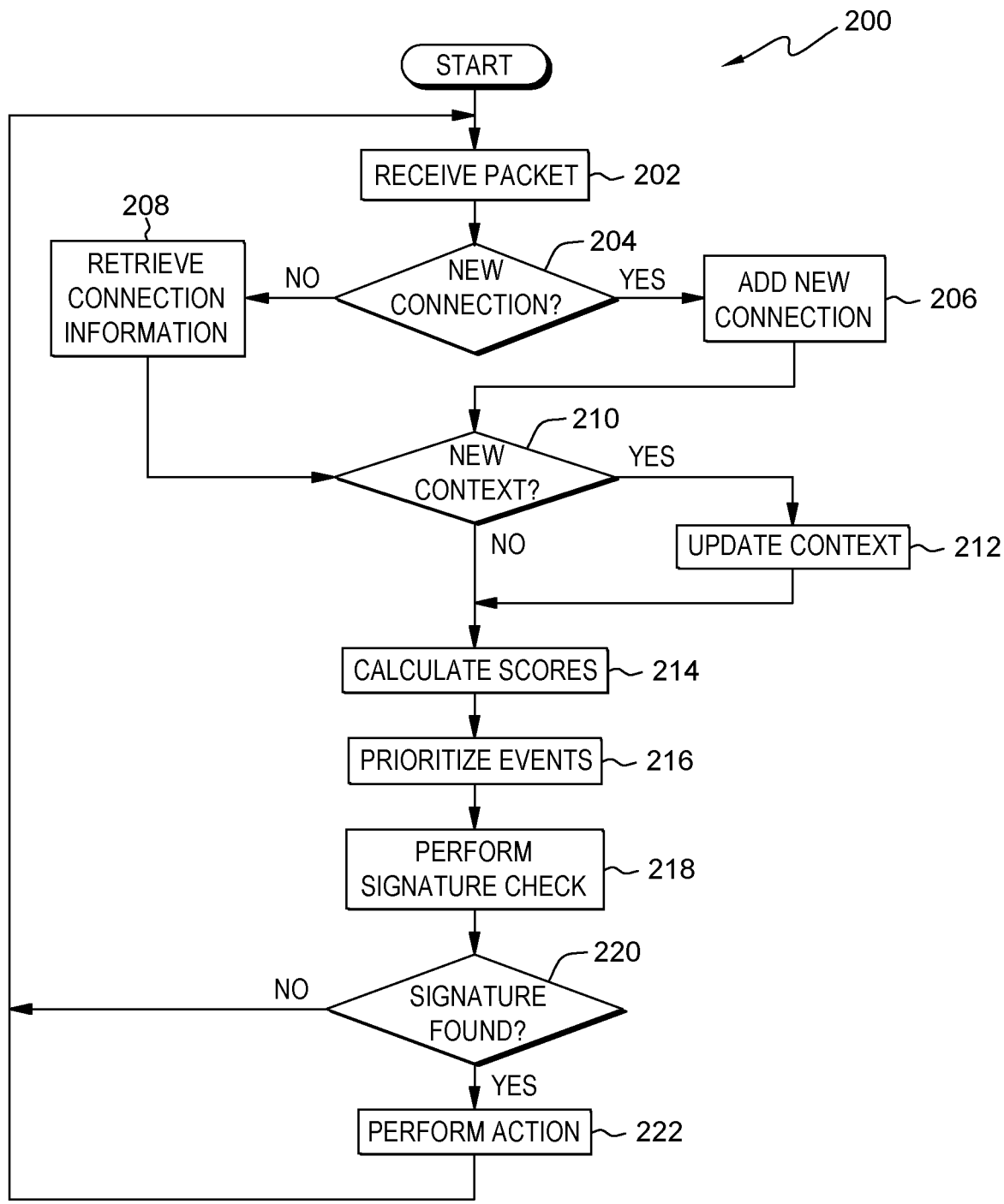
FIG. 2 depicts a flowchart of a program for prioritizing intrusion events, in accordance with an embodiment of the present invention.

FIG. 2 is a flowchart of workflow 200 depicting a method for prioritizing intrusion events, in accordance with an embodiment of the present invention. In one embodiment, the method of workflow 200 is performed by smart intrusion program 136. In an alternative embodiment, the method of workflow 200 may be performed by any other program working with smart intrusion program 136. In an embodiment, a user, via a user interface (not shown), may invoke workflow 200 upon the user starting one or more applications on a computing device. In an alternative embodiment, a user may invoke workflow 200 upon accessing smart intrusion program 136.

In an embodiment, smart intrusion program 136 receives a data packet (step 202). In other words, smart intrusion program 136 receives a data packet, sent from a first computing device, before the packet is received by a second computing device. In an embodiment, a data packet is a unit of data that is transmitted across a packet-switched network. A packet-switched network is an interconnected set of networks that are joined by routers or switching routers. The most common packet-switching technology is the transmission control protocol/Internet protocol (TCP/IP), and the Internet is the largest packet-switched network. In an embodiment, the concept of a packet-switched network is that any host connecting to the network may send packets to any other hosts. Data packets contain header (or control) information, which includes a destination address, and a payload (i.e., user data). Routers in the network read the address in the header information and forward the data packets along the most appropriate path to the destination IP address. In an embodiment, the TCP/IP connection is identified by a 5-tuple which refers to a set of five different values (source IP address, source port number, destination IP address, destination port number, and protocol) that comprise the TCP/IP connection. In an embodiment, smart intrusion program 136 receives a data packet, with a destination address of client device 130, which was sent from device 120. For example, a user has queried a search engine on the Internet and a web server has sent a response to the computing device of the user.

In an embodiment, smart intrusion program 136 determines whether a new connection is detected (decision step 204). In other words, smart intrusion program 136 determines whether a new connection is detected and needs to be added to a dynamic event table. In an embodiment (decision step 204, YES branch), a new connection is detected; therefore, smart intrusion program 136 proceeds to step 206 to add the new connection in a dynamic event table. In the embodiment (decision step 204, NO branch), a new connection is not detected; therefore, smart intrusion program 136 proceeds to step 208 to retrieve information about the existing connection.

Figures 3A, 3B, 3C:
FIG. 3A, FIG. 3B, and FIG. 3C are example dynamic event tables, in accordance with an embodiment of the present invention.

In an embodiment, smart intrusion program 136 adds a new connection (step 206). In other words, responsive to determining that a new connection is detected (decision step 204, YES branch), smart intrusion program 136 either creates a new dynamic event table for a connection context (and adds the connection context to the new dynamic event table) or adds a connection context to an existing dynamic event table for the detected connection. In an embodiment, the connection context is the type of connection established between two computing devices. In an embodiment, the dynamic event table includes the current connection context for an established connection, previous connection contexts, and a listing of prioritized IPS events. In an embodiment, the listing of prioritized IPS events is based on the current connection context. In an embodiment, each IPS event is given a score and the score is used to determine the priority of the IPS events. In an embodiment, each IPS event for the initial connection context in the dynamic event table is given the same score. In the embodiment, the score for each IPS event will increase, decrease, or remain the same based on the relationship of the IPS event to a connection context. In an embodiment, smart intrusion program 136 adds a connection context to a dynamic event table stored to repository 132 in client device 130. For example, as depicted in FIG. 3A of dynamic event table 300, a TCP (transmission control protocol) connection context is added to the dynamic event table.

In an embodiment, smart intrusion program 136 retrieves connection information (step 208). In other words, responsive to determining that a new connection is not detected (decision step 204, NO branch), smart intrusion program 136 retrieves the current connection context information from a dynamic event table. In an embodiment, smart intrusion program 136 retrieves the current connection context information from a dynamic event table stored to repository 132 on client device 130. For example, as depicted in FIG. 3A of dynamic event table 300, the information retrieved is that the current connection context is a TCP connection.

In an embodiment, smart intrusion program 136 determines whether the connection context is new (decision step 210). In other words, smart intrusion program 136 determines whether the current connection includes a new context. In one embodiment (decision step 210, YES branch), the context of the connection is new; therefore, smart intrusion program 136 proceeds to step 212 to update the connection context in the dynamic event table. In the embodiment (decision step 210, NO branch), the context of the connection is not new; therefore, smart intrusion program 136 proceeds to step 214.

In an embodiment, smart intrusion program 136 updates context (step 212). In other words, responsive to determining that the connection context is new (decision step 210, YES branch), smart intrusion program 136 updates the connection content in a dynamic event table. According to embodiments of the present invention, connection contexts may include the type of protocol used in the connection between two computing devices (e.g., TCP, UDP (user datagram protocol), ICMP (Internet control message protocol), SNMP (simple network management protocol), HTTPS (hypertext transfer protocol secure), and the like); the OS (operating system) type and version; the service and version; and the application (e.g., a social media website, an e-mail service, an Internet shopping portal, and the like). In an embodiment, smart intrusion program 136 updates the context in a dynamic event table stored to repository 132 on client device 130. For example, as depicted in FIG. 3B of dynamic event table 300, the connection context is updated to "openssl 1.0.1e" from the previous connection context "TCP".

In an embodiment, smart intrusion program 136 calculates scores (step 214). In other words, smart intrusion program 136 calculates the score for each IPS event in the dynamic event table based on the current connection context. In an embodiment, the score is based on the connection context (i.e., if a contexts is "openssl", then ssl-related IPS events will have a higher priority than non-ssl-related events or if the context is an application which runs in a particular OS, IPS events related to that particular OS will have a higher score than IPS events related to any other OS). In another embodiment, the score is calculated based on past historical data stored to a repository. In yet another embodiment, the score is calculated based on an algorithm such as the Maximum Likelihood Estimate (MLE), the least absolute shrinkage and selection operator (LASSO), the ElasticNet (EN) and the like. In an embodiment, MLE is a method of estimating the parameters of a statistical model given data. In an embodiment, LASSO is a regression analysis method that performs both variable selection and regularization in order to enhance the prediction accuracy and interpretability of the statistical model it produces. In an embodiment, EN, in the fitting of linear or logistic regression models, is a regularized regression method that linearly combines penalties of the lasso method. In an embodiment, smart intrusion program 136 calculates the score for each IPS event based on past historical data stored to repository 132 on client device 130. For example, as depicted in FIG. 3B of dynamic event table 300, the new connection context results in the following changes to the scores for each IPS event: the score for IPS event "1" changes from "50" to "0", the score for IPS event "2" changes from "50" to "80", and the score for IPS event 3 changes from "50" to "70".

In an embodiment, smart intrusion program 136 prioritizes events (step 216). In other words, smart intrusion program 136 prioritizes each IPS event based on the calculated score of each IPS event. In an embodiment, the IPS event with the highest score is given the highest priority; the IPS event with the second highest score is given the second highest priority, and so on, until all of the IPS events are prioritized. In an embodiment, in the case where two or more IPS events have the same score (e.g., IPS event "X" and IPS event "Y" both have a score of "25"), the two or more IPS events have the same priority (e.g., both IPS event "X" and IPS event "Y" have a priority of "5"). In another embodiment, an IPS event with a score of "0" is not monitored unless the score changes to a value other than "0". In an embodiment, smart intrusion program 136 prioritizes the IPS events in a dynamic event table stored to repository 132 based on the calculated scores for each of the IPS events. For example, as depicted in FIG. 3B of dynamic event table 300, IPS event "2" is given a priority of one based on the score of "80", IPS event "3" is given a priority of two based on a score of "70", and IPS event "1" is given a priority of three based on a score of "0".

In an embodiment, smart intrusion program 136 performs a signature check (step 218). In other words, smart intrusion program 136 performs a signature check of each IPS event with a score greater than "0" in the dynamic event table starting with the IPS event with the highest priority. In an embodiment, the signature check uses deep packet inspection to compare the signature of the information in the received data packet with the signatures of known malicious activities to detect incoming malicious activity. In an embodiment, smart intrusion program 136 compares the signature of the received data packet with the known signatures of malicious activity stored to repository 132 on client device 130. For example, as depicted in FIG. 3C of dynamic event table 300, the signatures of the data packets for IPS event "1", IPS event "2", and IPS event "3" are compared with the signatures of known malicious activities.

In an embodiment, smart intrusion program 136 determines whether a signature was found (decision step 220). In other words, smart intrusion program 136 determines whether the signature check performed in step 218 found any signatures in the received data packet that matched the signatures of known malicious activities. In one embodiment (decision step 220, YES branch), one or more matching signatures were found; therefore, smart intrusion program 136 proceeds to step 222 to perform one or more actions. In the embodiment (decision step 220, NO branch), no matching signatures were found; therefore, smart intrusion program 136 returns to step 202 to wait for the receipt of additional data packets.

In an embodiment, smart intrusion program 136 performs an action (step 202). In other words, responsive to determining that one or more matching signatures were found (decision step 220, YES branch), smart intrusion program 136 performs one or more actions based on the matched signature. In an embodiment, the one or more actions include stopping the activity from proceeding when the activity is deemed malicious (i.e., finding matching signatures), discarding the activity (i.e., data packets) when finding matching signatures, resetting the connection and/or blocking the traffic from the offending IP (Internet protocol) address when finding matching signatures, and sending an alert when matching signatures are found which deem the activity malicious.

Figure 4:
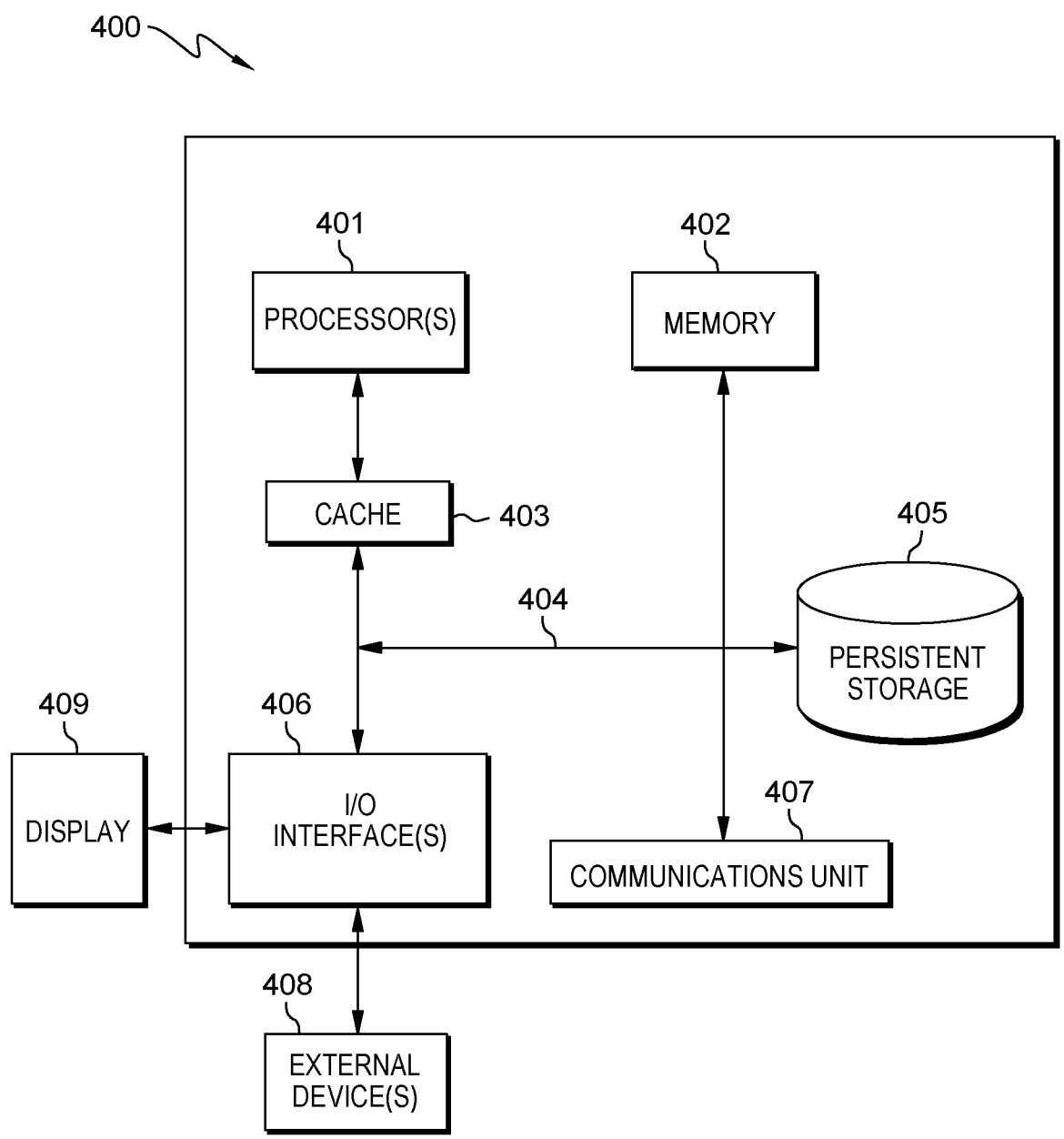
FIG. 4 depicts a block diagram of components of the computing environment of FIG. 1, in accordance with an embodiment of the present invention.

FIG. 4 depicts computer system 400, which is an example of a system that includes smart intrusion program 136. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:
1. A method for prioritizing intrusion events that enhances the efficiency of signature matching of malicious activity, the method comprising:
responsive to determining that a new connection corresponding to a transmitted data packet is detected, adding, by one or more computer processors, a con- nection context associated with the new connection to a current connection context in a dynamic event table, wherein:
the connection context is based on one or more of: an operating system type associated with the connection, an operating system version associated with the connection, and an application responsible for sending the data packet associated with the connection, and
the dynamic event table includes the current connection context, one or more previous connection contexts, and a listing of two or more events, wherein each event of the two or more events is a malicious activity and is associated with a respective data packet;
calculating, by one or more computer processors, a score for each event of two or more events in the dynamic event table based on the current connection context;
performing, by one or more computer processors, a signature check of each event having a score greater than or equal to a threshold value among the two or more events according to a prioritized order based on the calculated score; and
responsive to determining that a signature was found for an event among the two or more events, preventing, by one or more computer processors, intrusion of the data packet associated with the event.

2. The method of claim 1, wherein
the score for each event of the one or more events in the dynamic event table is the score based on the connection context; and
the connection context includes a type of protocol used in the connection between two computing devices, an operating system type, the operating system version, and the application.

3. The method of claim 1, wherein the step of performing, by one or more computer processors, a signature check of each event having a score greater than or equal to a threshold value among the two or more events according to a prioritized order based on the calculated score, comprises:
performing, by one or more computer processors, a deep packet inspection to compare one or more signatures in the received data packet to one or more signatures of known malicious activity.

4. The method of claim 1, wherein responsive to determining that a signature was found for an event among the two or more events, preventing, by one or more computer processors, intrusion of the data packet associated with the event is selected from the group consisting of stopping an activity from proceeding when the activity is deemed malicious, discarding the activity when finding matching signatures, resetting the connection and/or blocking traffic from an offending Internet protocol address when finding matching signatures, and sending an alert when matching signatures are found which deem the activity malicious.

5. The method of claim 1, wherein responsive to determining that a signature was found for an event among the two or more events, preventing, by one or more computer processors, intrusion of the data packet associated with the event consists: stopping an activity from proceeding when the activity is deemed malicious, discarding the activity when finding matching signatures, resetting the connection, blocking traffic from an offending Internet protocol address when finding matching signatures, and sending an alert when matching signatures are found which deem the activity malicious.

6. A computer program product for prioritizing intrusion events that enhances the efficiency of signature matching of malicious activity, the computer program product comprising:
one or more computer readable storage media; and
program instructions stored on the one or more computer readable storage media, the program instructions comprising:
responsive to determining that a new connection corresponding to a transmitted data packet is detected, program instructions to add a connection context associated with the new connection to a current connection context in a dynamic event table, wherein:
the connection context is based on one or more of: an operating system type associated with the connection, an operating system version associated with the connection, and an application responsible for sending the data packet associated with the connection, and
the dynamic event table includes the current connection context, one or more previous connection contexts, and a listing of two or more events, wherein each event of the two or more events is a malicious activity and is associated with a respective data packet;
program instructions to calculate a score for each event of two or more events in the dynamic event table based on the current connection context;
program instructions to perform a signature check of each event having a score greater than or equal to a threshold value among the two or more events according to a prioritized order based on the calculated score; and
responsive to determining that a signature was found for an event among the two or more events, program instructions to prevent intrusion of the data packet associated with the event.

7. The computer program product of claim 6, wherein
the score for each event of the one or more events in the dynamic event table is the score based on the connection context; and
the connection context includes a type of protocol used in the connection between two computing devices, an operating system type, the operating system version, and the application.

8. The computer program product of claim 6, wherein the program instructions to perform a signature check of each event having a score greater than or equal to a threshold value among the two or more events according to a prioritized order based on the calculated score, comprises:
program instructions to perform a deep packet inspection to compare one or more signatures in the received data packet to one or more signatures of known malicious activity.

9. The computer program product of claim 6, wherein responsive to determining that a signature was found for an event among the two or more events, program instructions to prevent intrusion of the data packet associated with the event is selected from the group consisting of program instructions to stop an activity from proceeding when the activity is deemed malicious, program instructions to discard the activity when finding matching signatures, program instructions to reset the connection, program instructions to block traffic from an offending Internet protocol address when finding matching signatures, and program instructions to send an alert when matching signatures are found which deem the activity malicious.

10. The computer program product of claim 6, wherein responsive to determining that a signature was found for an event among the two or more events, program instructions to prevent intrusion of the data packet associated with the event consists: program instructions to stop an activity from proceeding when the activity is deemed malicious, program instructions to discard the activity when finding matching signatures, program instructions to reset the connection, program instructions to block traffic from an offending Internet protocol address when finding matching signatures, and program instructions to send an alert when matching signatures are found which deem the activity malicious.

11. A computer system for prioritizing intrusion events that enhances the efficiency of signature matching of malicious activity, the computer system comprising:
  one or more computer processors;
  one or more computer readable storage media; and
  program instructions stored on the one or more computer readable storage media for execution by at least one of the one or more computer processors, the program instructions comprising:
    responsive to determining that a new connection corresponding to a transmitted data packet is detected, program instructions to add a connection context associated with the new connection to a current connection context in a dynamic event table, wherein:
      the connection context is based on one or more of: an operating system type associated with the connection, an operating system version associated with the connection, and an application responsible for sending the data packet associated with the connection, and
      the dynamic event table includes the current connection context, one or more previous connection contexts, and a listing of two or more events, wherein each event of the two or more events is a malicious activity and is associated with a respective data packet;
    program instructions to calculate a score for each event of two or more events in the dynamic event table based on the current connection context;
    program instructions to perform a signature check of each event having a score greater than or equal to a threshold value among the two or more events according to a prioritized order based on the calculated score; and
    responsive to determining that a signature was found for an event among the two or more events, program instructions to prevent intrusion of the data packet associated with the event.

12. The computer system of claim 11, wherein
  the score for each event of the one or more events in the dynamic event table is the score based on the connection context; and
  the connection context includes a type of protocol used in the connection between two computing devices, an operating system type, the operating system version, and the application.

13. The computer system of claim 11, wherein responsive to determining that a signature was found for an event among the two or more events, program instructions to prevent intrusion of the data packet associated with the event is selected from the group consisting of program instructions to stop an activity from proceeding when the activity is deemed malicious, program instructions to discard the activity when finding matching signatures, program instructions to reset the connection, program instructions to block traffic from an offending Internet protocol address when finding matching signatures, and program instructions to send an alert when matching signatures are found which deem the activity malicious.

14. The computer system of claim 11, wherein responsive to determining that a signature was found for an event among the two or more events, program instructions to prevent intrusion of the data packet associated with the event consists: program instructions to stop an activity from proceeding when the activity is deemed malicious, program instructions to discard the activity when finding matching signatures, program instructions to reset the connection, program instructions to block traffic from an offending Internet protocol address when finding matching signatures, and program instructions to send an alert when matching signatures are found which deem the activity malicious.

15. The computer system of claim 11, wherein the program instructions to perform a signature check of each event having a score greater than or equal to a threshold value among the two or more events according to a prioritized order based on the calculated score, comprises:
  program instructions to perform a deep packet inspection to compare one or more signatures in the received data packet to one or more signatures of known malicious activity.

* * * * *